Figure 5:
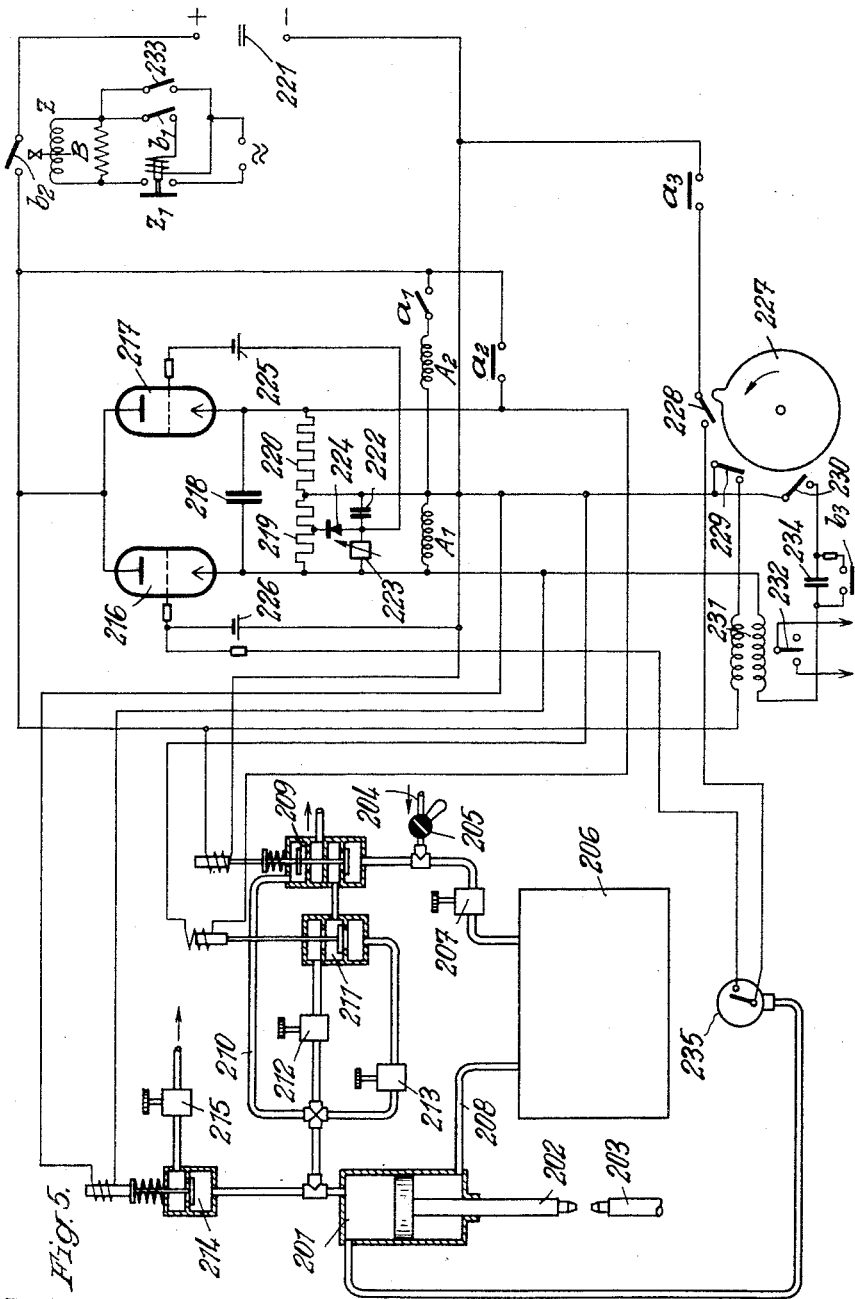

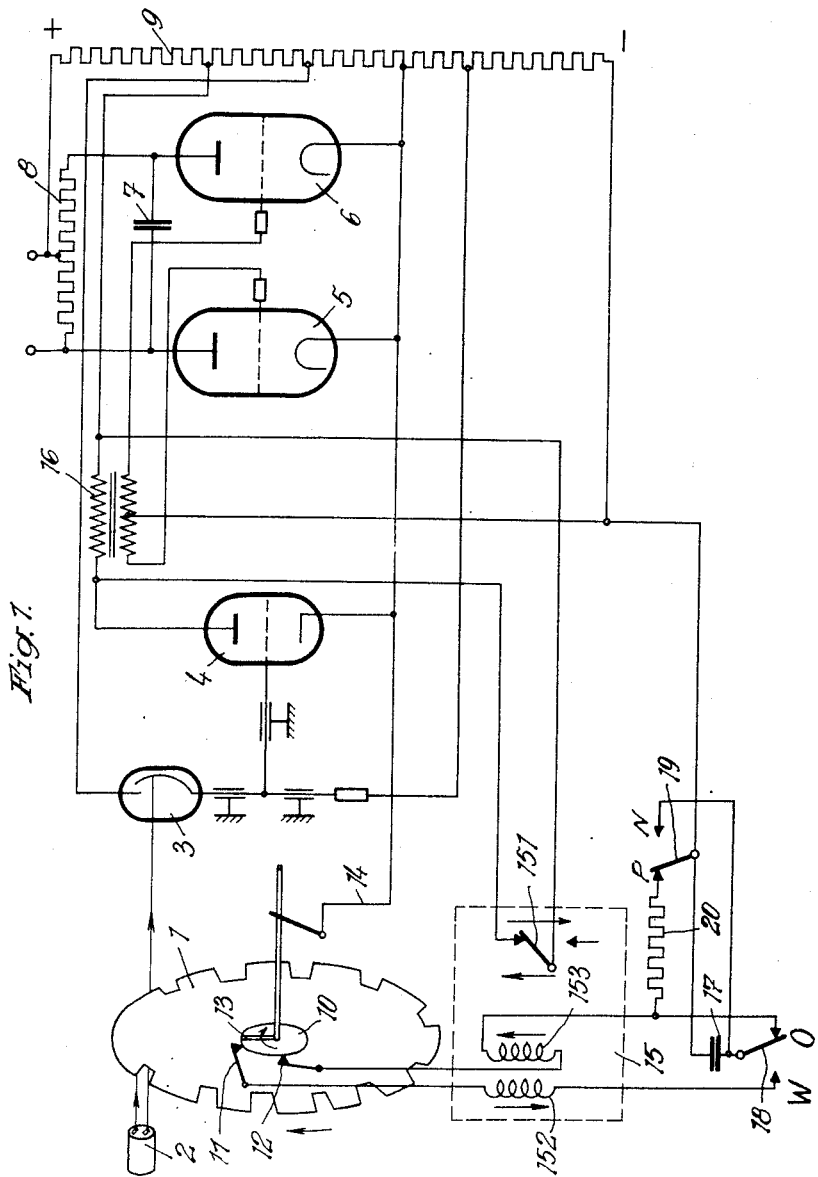

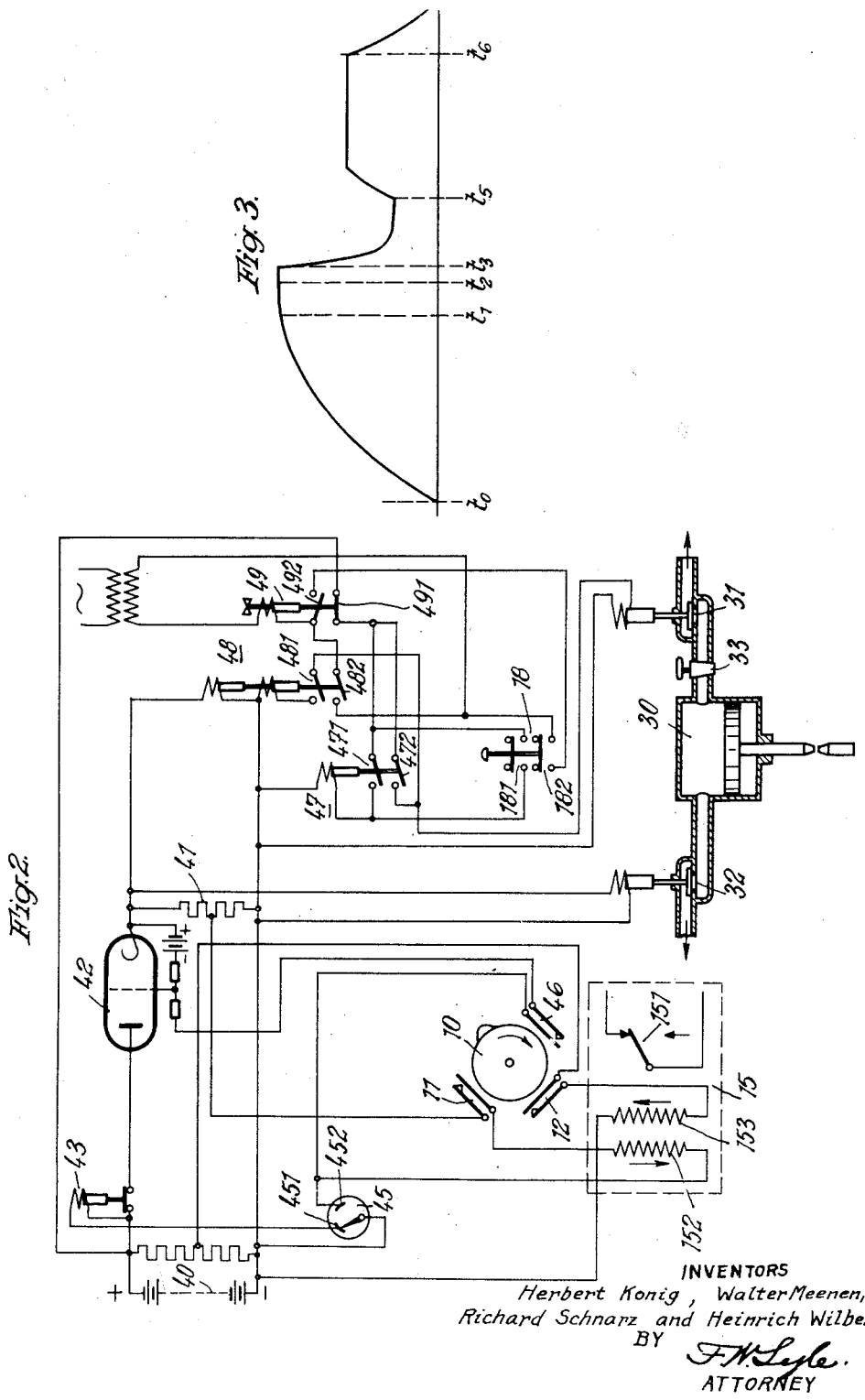

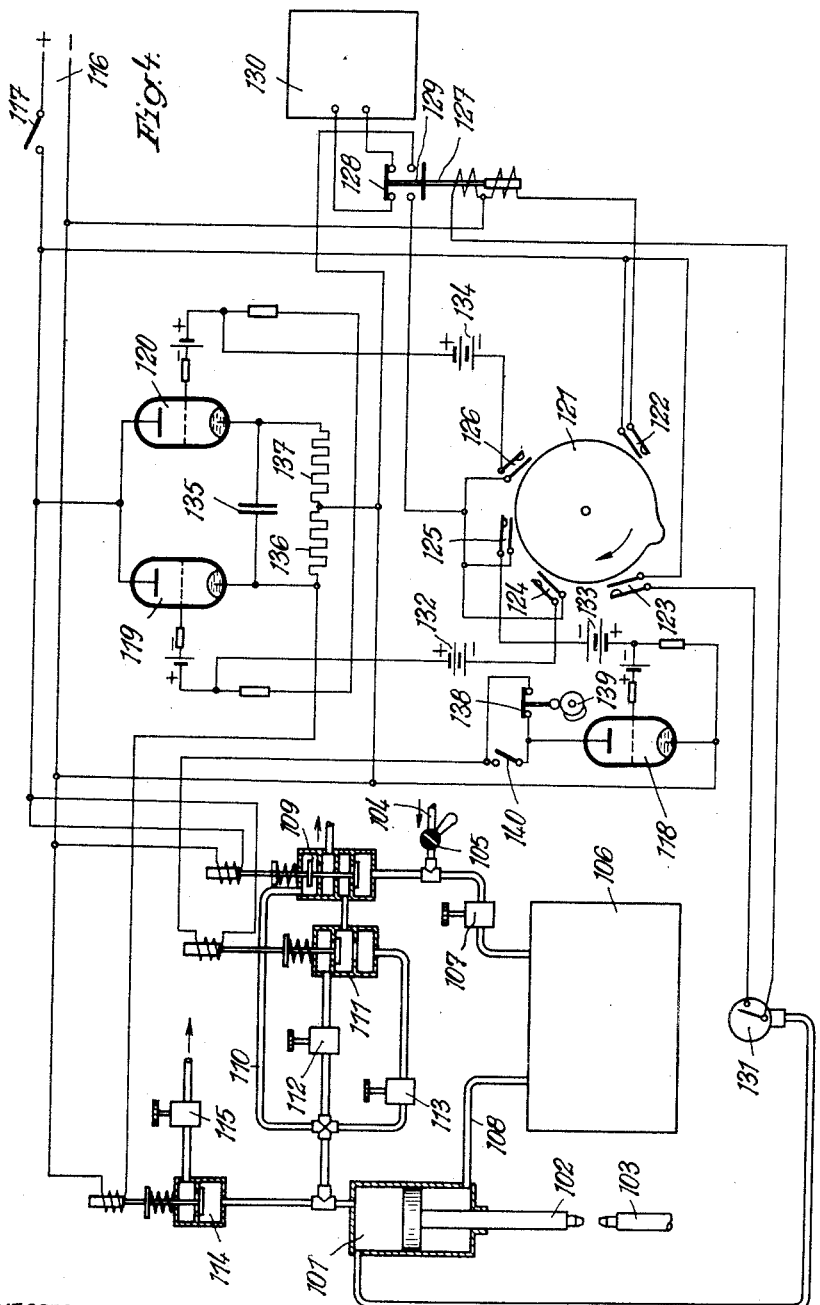

Patented Dec. 10, 1940

2,224,733

UNITED STATES PATENT OFFICE 2,224,733

CONTROL APPARATUS FOR SPOT OR SEAM WELDING BY MEANS OF CONTROLLABLE DISCHARGE VESSELS

Herbert König, Berlin-Charlottenburg, Walter Meenen, Berlin-Friedenau, Richard Schnarz, Berlin-Siemensstadt, and Heinrich Wilbert, Berlin-Steglitz, Germany, assignors to Westinghouse Electric & Manufacturing Company, East Pittsburgh, Pa., a corporation of Pennsylvania Application February 5, 1938, Serial No. 188,932
In Germany October 6, 1936

7 Claims. (Cl. 219—4)

The invention relates to spot or seam welding apparatus in which the welding current is regulated by means of controllable discharge vessels, preferably grid-controlled mercury-vapour discharge vessels. In such arrangements, the welding transformer is connected through two oppositely and parallel connected discharge vessels to an alternating current network, the welding current being switched in and out and in addition regulated in value by grid control.

The main object of the invention is an improved arrangement for controlling the discharge vessel or vessels which is particularly, although not exclusively, suitable for use with light metal weldings.

In the improved control apparatus according to this invention an interrupter device or switching arrangement is connected in the control circuit of the discharge gaps in the welding current circuit, and is arranged to cause successively, during each welding operation, blocking means in the grid circuit of the main discharge vessels to be rendered ineffective, then the time of ignition of the discharge vessels to be varied in accordance with a prescribed programme so as to provide an increase and a subsequent decrease in the current and finally the blocking means for the discharge vessels to be again rendered effective. With the control arrangement according to the invention, the welding current during each welding operation can be varied in a particularly advantageous manner in accordance with a programme which has been previously fixed to suit metallurgical considerations depending on the material to be welded. The interrupter device in the control circuit of the discharge gaps is so designed that a control impulse for rendering ineffective the blocking means for the discharge gaps is operated before, and a control impulse for again rendering the blocking means effective is operated after, the actual control programme for the welding current, this ensuring that on actuation of an auxiliary switch for initiating the welding process, for example, the pedal switch of a welding machine, the programme controlling the welding current is carried out completely without the time at which the auxiliary switch is actuated having any influence on the control programme. With the apparatus according to this invention, the programme commences following actuation of the auxiliary switch, at its beginning and is completed once. Unless otherwise arranged, the programme is completed only once even when after this programme has been completed the auxiliary pedal switch of the welding machine is still maintained in its closed position.

If desired the control apparatus may be provided with control means for varying the electrode pressure in accordance with a predetermined programme in addition to the interrupter device for varying the welding current to suit a desired programme.

According to a further feature of this invention, the control means for varying the electrode pressure is so constructed that the time of the pressure programme can be shifted as desired relatively to the welding current programme. Thus, the two programme controls, that is, the programme control of the welding current and the programme control of the electrode pressure are made as independent of one another as is possible.

The control device for varying the electrode pressure may be so constructed that either the whole or individual phases of the pressure programme can be shifted in time relatively to the current programme. This means that a pressure programme with fixed duration, that is, fixed intervals of time between the different parts of the programme at which increases and decreases of the pressure occur, is adjustable in time as a whole relatively to the current programme or that the intervals of time between the individual parts at which the pressure variations occur, are adjustable as desired with respect to one another and the current programme.

This has the advantage that each of the two programmes can be independently selected to suit the particular characteristics of the material to be welded. This selection or adjustment can also be made during operation as the switching and control devices provided on the one hand for the control of the welding current, and on the other hand for the control of the electrode pressure are preferably so constructed that the time sequence and time intervals of the switching operations controlling the development of the programme in question can be shifted with respect to each other. The relationship between the control of the current programme and the control of the pressure programme is fixed, with the control arrangement of the invention, only insofar as the control processes by which the welding current is varied are preferably made dependent upon a relay dependent on pressure, for example, the maximum contact of a manometer responsive to the pressure in a compressed air cylinder pressing the electrodes together. Only when this maximum contact is closed can a blocking device in the control circuit of the discharge vessels be released to enable a connection between the control device for the current programme and the discharge vessels to be established. Otherwise, however, the carrying out of the current programme and the carrying out of the pressure programme are independent of one another. A control dependent on the time of the pressure programme provided according to this feature of the invention has the further advantage that changing over of the valves in the compressed air pipes is not dependent upon relays or other devices responsive to pressure. Greater accuracy is thereby attained and any disadvantages which might arise due to uncontrollable delays in the control apparatus, are avoided.

The control apparatus can according to a feature of the invention be further improved by so designing the control means for varying the electrode pressure that the values of the electrode pressure before and after a fall in this pressure are independent of one another. The result of this is that the pressure programme can be adapted to a still greater extent to suit the characteristics of the material to be welded. For example, with such a control arrangement, a pressure programme can be obtained in which the electrode pressure after the fall of pressure, that is, after the switching on of the welding current, is greater than the electrode pressure before the current programme.

Four convenient arrangements according to this invention will now be described, by way of example, with reference to the accompanying drawings, in which:

Figures 1, 2, 4 and 5 are wiring diagrams of the control apparatus, the main welding circuits being omitted for the sake of simplicity, and Figure 3 is a curve showing the electrode pressures used in the arrangement shown in Figure 2.

Figure 1 shows the essential parts of the control circuit of the discharge vessels located in the welding current circuit, of the first arrangement. In this arrangement an interrupter device in the grid circuit of the discharge vessels consists of a disc 1 driven by a synchronous motor (not shown), this disc being hereinafter referred to as the programme disc. The circumference of the disc 1 is provided with recesses or slots which allow a beam of light to pass from a source of light 2 on one side of the disc to a photo-electric cell 3 on the other side of the disc. Thus, as the disc rotates the beam of light is alternately blocked and allowed to influence the cell. The photo-cell 3 acts, through an amplifying valve 4, on the grid circuit of two gas- or vapour-filled discharge vessels 5 and 6, the anodes of which are connected together by a condenser 7 and a resistance 8 in parallel therewith. A central tapping of the resistance 8 and the cathodes of the two discharge vessels 5 and 6 are supplied with a direct current voltage from a potentiometer resistance 9. The two discharge vessels 5 and 6 are connected together as in a direct-alternating converter. The connection of either the left or right hand half of the resistance 8 to the source of direct current depends upon which of the two discharge vessels 5 or 6 is ignited. The voltage across the left hand half of the resistance 8 is supplied to the grid circuit of the main discharge vessel or vessels (not shown in Figure 1) located in the welding circuit. The photocell 3 is so connected to the grid circuit of the discharge vessels 5 and 6 that the main discharge vessels are ignited when the photo-cell 3 is illuminated, that is to say when an opening or slot in the programme disc 1 permits the light beam from the source 2 to fall on the photo-cell 3.

Although the use of two gas discharge vessels connected together in the manner of a direct-alternating connection, as are the vessels 5 and 6 in Figure 1, is particularly suitable for the production of the control potential for igniting the main discharge vessels, other known control circuits can also be used in an arrangement according to this invention. It is, however, necessary that the programme disc 1 should determine, as by means of the photo-cell, the control potentials transferred to the grid circuit of the main discharge vessels so that these discharge vessels are controlled in accordance with a programme which is predetermined by the shape of the programme disc.

The source of light 2, as shown, emits two light beams and these two beams of light are spaced with respect to the programme disc 1 so that as the disc is rotated, they are caused to impinge on the photo-cell 3 one after the other as a slot crosses the beams. The distance between the two beams of light is so dimensioned that assuming a predetermined speed of rotation of the disc 1, the control impulses which are successively produced on the grid circuit of the discharge vessel by the two beams of light, are phase displaced with respect to one another by exactly 180°. This means that each slot in the programme disc 1 produces a control impulse which provides, in one cycle of the alternating current, exactly the same modulation for two main discharge vessels in the welding circuit. If a slot in the circumference of the programme disc 1 is so located that the first beam from the light source 2 causes, through the photo-cell 3, ignition at the instant of maximum voltage of the alternating current in the welding circuit, then both discharge vessels in the welding circuit are ignited at exactly the same instant.

This design of interrupter device in the grid circuit of the discharge vessels has the important advantage that extreme accuracy is not required in making the recesses or slots on the circumference of the programme disc 1. If, due to inaccuracy of a machine tool, a slot is cut out slightly otherwise than was intended, the only result is that the variation in the welding current during one revolution of the disc, does not exactly correspond to the desired programme. It is, however, far more important that in a cycle of the alternating current, the modulation of both discharge vessels is under all circumstances exactly the same since with unequal modulation of the discharge vessels, a direct current component is produced in the welding current which may cause undesired charging and flash ignition of the discharge vessels, with the known dangers.

The width of the slots on the circumference of the programme disc 1 depends upon the time during which a positive control potential is to persist in the grid circuit of the main discharge vessels. It has been found that it is preferable to make all the slots of the same width and to select their positions on the circumference of the disc to correspond to the ignition times desired. The manufacture of the discs is then comparatively simple and it is possible to provide a larger number of programme discs for one welding machine, the several discs giving different welding current programmes.

If desired, any suitable form of control which acts without direct mechanical contact may be used instead of the photo-electric cell control arrangement described above. Thus, for example, a programme disc, similar to the disc shown in Figure 1 can control, instead of beams of light, the lines of force of an electromagnet which is so arranged that depending on the positions of the slots in the disc the magnetic circuit is either closed or opened. Such an arrangement can also embody the feature that the same slot in the programme disc always releases successively two control impulses which are phase displaced by 180°.

The spindle of the programme disc 1 also carries, as shown by Figure 1, a mechanical contact device consisting of a rotating disc 10 which co-operates with two fixed contacts 11 and 12. The disc 10 has extending from a part of its periphery to its centre a conductive coating 13 which, as the disc revolves, connects the two contacts 11 and 12 successively to the supply conductor 14. The two contacts 11 and 12 are respectively connected to two coils 152 and 153 of a polarised relay 15 having its operating contact 151 connected in parallel with an auxiliary transformer 16 in the grid circuit of the two discharge vessels 5 and 6. As indicated by the directional arrows in Figure 1, a current flowing through the coil 152 opens the contact 151 whilst a current flowing through the coil 153 closes this contact.

The transformer 16 in the grid circuit of the discharge vessels 5 and 6 is an important factor in controlling the blocking and ignition of the auxiliary vessels 5 and 6 for supplying the control potential of the main vessels. As long as the transformer 16 is short-circuited by the contact 151 of the polarised relay 15, the discharge vessel 5 cannot be ignited and consequently the left hand half of the resistance 8 cannot be switched-in. The main vessels in the welding circuit remain blocked independently of whether or not the programme disc 1 allows light to pass to the photo-cell 3.

The polarised relay 15, in combination with the contact device 10 to 13, thus constitutes the part of the control device by which a control impulse is produced both before and also after the actual control programme for the welding current, the first of these two impulses releasing the blocking of the main discharge gaps whilst the second impulse renders this again effective. The positions of the two contacts 11 and 12 are so chosen that the control impulses caused by the programme disc 1 are produced during the time interval between the operation of these two contacts, that is, after the contact 11 has engaged the coating 13 and before the contact 12 engages this coating. The constructional form of the contact device 10 to 13 is naturally not important and any arrangement, other than that shown in Figure 1, which operates in a suitable manner can be used. It will also be appreciated that it is immaterial whether the polarised relay 15 is, as in the example shown, controlled by a contact device mounted on the same spindle as the programme disc 1 or whether the programme disc 1 carries, for example, projections by which contacts are controlled which are arranged in appropriate positions on the circumference of the disc. It is, however, important that the desired sequence and time intervals between the operation of the two contacts 11 and 12 and the control impulses caused by the programme disc 1 should be maintained. Preferably, the construction of the whole interrupter device comprising the programme disc 1 and the contact device 10 to 13, is such that the contact device 10 to 13 is a mechanically operated arrangement, whilst the programme disc 1 controls by a photoelectric cell or analogous means which does not include any direct mechanical contact.

The polarised relay 15 is connected through a condenser 17 to the negative pole of the source of direct current, that is to the negative end of the potentiometer resistance 9. Between the condenser 17 and the relay 15 is an auxiliary switch 18 for initiating a welding operation, for example, a pedal switch on the welding machine. This switch connects the lower coating of the condenser 17 either to the relay coil 152 or to the relay coil 153. By means of a further change-over switch 19, the condenser 17 can be short-circuited or its upper coating connected, in series with a resistance 20, to the right hand contact of the auxiliary switch 18. The two contacts of the auxiliary switch 18 are indicated by O and W corresponding respectively to the "open" and "welding" conditions in the main welding circuit. The change-over switch 19 controls the setting of the apparatus for either spot or seam welding, the two positions of this switch being indicated P and N respectively corresponding to spot and seam welding.

The method of operation of the control arrangement shown in Figure 1 is as follows: As long as the auxiliary switch 18 is in the position O the coil 153 of the polarised relay 15 is connected through the condenser 17 to the negative end of the resistance 9. On closing of the contact 12 of the interrupter device, the relay 15 receives a current impulse which causes contact 151 to close. The transformer 16 in the grid circuit of the discharge vessels 5 and 6 is thus short-circuited and control impulses from the programme disc 1 cannot reach the grid circuit of the main discharge vessels. As long as the change-over switch 19 is in position P, as indicated, i. e., in the position corresponding to spot welding, the condenser 17 is closed through the resistance 20 and is always discharged during the time interval between successive closings of the contact 12. The contact 151 of the relay 15 remains closed.

If now the auxiliary switch 18, i. e., the pedal switch of the welding machine, is changed over to the position W then the condenser 17 is connected to the other coil 152 of the relay 15. The condenser receives a charging impulse at the moment when the contact 11 of the contact device is closed, this impulse passing through relay coil 152 and thus causing the contact 151 of the relay 15 to open. The control circuit of the discharge vessels 5, 6 and therewith the control circuit to the main discharge vessels is thus released and impulses under the control of the programme disc 1 will be effective.

The instant at which the auxiliary switch 18 is actuated does not affect the control programme. Under all circumstances the control programme always commences at its beginning and is completely carried out at least once independently of the duration of the actuation of the auxiliary switch 18. This is attained by the combination of the contact disc 1 and the contact device 10 to 13. If the auxiliary switch is closed at, say, about the centre of the run of the control programme, the control programme can only begin at the correct point because the instant of actuation of the auxiliary switch 18 assumed above is subsequent to the instant at which the relay 15 can be actuated by the contact 11 to open the contact 151 and release the grid control path. It is not until the contact 11 is closed after the closing of the auxiliary switch 18, that the relay 15 can release the grid control and this can only take place at the commencement of the control programme. Actuation of the contact 12, i. e., the contact which causes operation of the relay 15 in the opposite direction, takes place after the expiration of the programme. If the auxiliary switch 18 is kept in its closed position W after the instant of operation of contact 12, the control programme cannot be repeated a second time since, at the end of the programme, the relay coil 153 is connected through the contact 12 and the resistance 20 to the negative end of the source of direct potential. The relay closes its contact 151 and thereby prevents control of the discharge vessels 5, 6, by the photo-cell 3. Release of the control by the contact 11 is not possible as the condenser 17, which has been charged and consequently due to its charge, blocks the circuit of the relay coil 152. The control programme can thus only be carried out once irrespective of whether the switch 18 is closed for a long or short time. This is also true with the change-over switch 19, in the position P shown, i. e., in the position for spot welding. If, however, this switch is in position N for seam welding, the conditions are different. The condenser 17 is now short-circuited through the switch 19 and the programme is carried out as long as the auxiliary switch 18 is kept closed. In this position of the switch 19, however, the programme also commences only at the beginning when the auxiliary switch 18 is first closed.

It is to be understood that the relay 15 only constitutes one means for controlling the connection between the programme disc 1 and the grid circuit of the main discharge vessels so that this connection can be interrupted or released (rendered effective). Instead of short-circuiting of the transformer 16 in the grid circuit of the discharge vessels 5 and 6, other means can be used, for example, the switching on or off of a negative blocking potential or the like. In each case it is important that at the instant of closing of the two contacts 11 and 12, the grid circuit of the main discharge vessels should be blocked and then opened again quickly. The main discharge vessels must receive a stop impulse and a start impulse in rapid succession.

In the arrangement shown in Figure 2, which is a development of that shown in Fig. 1, a relay 15 having two relay coils 152 and 153 and an operating contact 151 is provided as in the arrangement of Fig. 1, the two relay coils being also controlled by a disc 10 about the circumference of which are arranged two contacts 11 and 12. As shown in Fig. 2, however, the disc 10 is in the form of a cam and each of the contacts 11 and 12 comprises two spring contacts which are closed by the cam disc. As with the arrangement of Fig. 1, the contacts 11 and 12 control the blocking and unblocking of the control between the photo-cell control and the discharge vessels in the welding circuit. The programme disc with the corresponding control parts is omitted from Fig. 2 for the sake of simplicity.

The main difference between the arrangement of Fig. 2 and that of Fig. 1 is that the arrangement of Fig. 2 has, in addition to means for providing a programme control of the welding current, means for giving programme control of the electrode pressure. Investigations which have been made, inter alia, by Bollenrath have shown that it is advantageous for light metal welding to vary not only the welding current but also the electrode pressure according to a predetermined programme. A suitable pressure programme is shown by the curve in Fig. 3 from which it will be seen that the pressure should at first rise gradually, then at a predetermined instant be lowered after which it should be again increased to an intermediate value. The control programme of the welding current is initiated at approximately the instant when the pressure is lowered but the instant for the initiation of the programme of the welding current relatively to the pressure programme is selected to suit particular conditions determined by the material to be welded. The current can be started at the instant when the pressure is lowered or it can be started only when the pressure, after being lowered, reaches its minimum limiting value. The control arrangement is, therefore, preferably so constructed that the pressure programme can be shifted in time relatively to the current programme. In the arrangement shown in Fig. 2, the lowering of the pressure and the commencement of the welding current approximately coincide.

In this arrangement the electrode pressure is controlled by an air pressure cylinder 30 having an inlet valve 31 and an outlet valve 32. A regulating device 33 controls the pressure rise in the cylinder 30 when the inlet valve 31 is opened. The regulator 33 can be adjusted by electric control to suit the requirements of the pressure programme.

The control circuit for the welding current and the electrode pressure depends mainly on a resistance 41 being supplied from a source 40 of direct current through a mercury vapour discharge vessel 42. In series with the discharge vessel is a relay 43 by means of which its anode circuit can be interrupted for quenching purposes. The control grid of the discharge vessel 42 is connected through a contact 46 to a manometer 45. The manometer 45 is responsive to the pressure in the electrode compressed air cylinder 30 whilst the contact 46 is controlled by the disc 10 and is so arranged with respect to the two other contacts 11 and 12 that it is closed before these contacts.

An auxiliary switch 18 which corresponds to the auxiliary switch 18 of Fig. 1, that is to the pedal switch of the welding machine serves for initiating the welding process. The auxiliary switch 18 controls two relays 47 and 48, the contacts of which are also connected to a time delay relay 49.

The functions of the separate relays and other apparatus employed in the arrangement of Fig. 2 will be most clearly understood from a brief description of the functioning of the arrangement during a single spot weld.

In the position of rest, the contact 451 of the manometer 45 is closed since there is no pressure in the pressure cylinder 30. The circuit of the relay 43 is closed through the contact 451 and the anode circuit of the discharge vessel 42 is open. The two valves 31 and 32 in the compressed air pipes of the cylinder 30 are closed.

When the pedal switch 18 is actuated to close its contacts 181 and 182 first the relay 47 is energised through the upper contact 181, this relay completing a holding circuit for itself through its contact 471 so that it remains energised even should the pedal switch 18 be opened at once. The lower contact 472 of the relay 47 closes the circuit of the inlet valve 31 of the cylinder 30, this circuit including the closed lower auxiliary contact 491 of the time-delay relay 49. The valve 31 is opened and the pressure in the cylinder 30 gradually rises. The time at which the pressure commences to rise is indicated at $t_0$ in Fig. 3.

At the time $t_1$ the pressure reaches its maximum value and the manometer 45 closes the right hand contact 452. When the manometer contact 451 opens, the circuit of the relay 43 is interrupted and the anode circuit of the discharge vessel 42 is closed. The control grid of the discharge vessel 42 is connected through the contact 452 of the manometer and the contact 46 of the disc 10 to the negative pole of the source 40 of direct potential and thence through the resistance 41 to the cathode of the discharge vessel. As soon as the contact 46 is closed following closing of the manometer contact 452 at the time point $t_1$ in Fig. 3, the discharge vessel 42 ignites and closes the circuit of the resistance 41. The instant of ignition is indicated at $t_2$ in Fig. 3. The interval between the times $t_1$ and $t_2$ is not fixed, but depends upon the position of the contact disc 10 at the moment when the manometer closes its contact 452.

With the resistance 41 in series in the circuit of the discharge vessel 42, the voltage drop across the resistance is supplied to the coil of the outlet valve 32 of the pressure cylinder 30. At the expiration of a time delay which is definite and depends upon the construction of the valve, the valve 32 opens and the pressure commences to fall at the time $t_3$ (Fig. 3). At the same time, however, the welding current programme commences since, after closing of the contact 46 by the contact disc 10, the contact 11 is closed (as has been explained above with reference to Fig. 1) and the relay 15 operates its contact 151. The distance between the contacts 46 and 11 on the circumference of the contact disc 10 is so chosen, that the fall of pressure and the commencement of the welding current take place approximately simultaneously. This distance can be varied by shifting the contacts on the circumference of the disc 10, for example, in such a manner, that the welding current does not commence until the electrode pressure has fallen by a predetermined amount.

The energising circuit of the release coil 152 of the relay 15 includes not only the contact 11 but also the contact 452 of the manometer 45. The current programme can thus only commence when the pressure of the electrodes has previously risen to the desired maximum value. If a welding programme is to be such that the welding current is only to commence after the fall of pressure, the manometer 45 must be provided with a slight time delay so that its contact 452 remains closed after the pressure has fallen by a predetermined amount.

On the switching-on of the resistance 41, in addition to the energisation of the coil of the valve 32, the upper coil of the relay 48 is also closed. This relay attracts and closes first its upper contact 481, which acts as a holding contact and connects the lower coil of the relay 48 through the contact 472 of the relay 47 to the positive pole of the source 40. The lower contact 482 of the relay 48 closes the circuit of the time relay 49 which, at this instant (time $t_2$ in Fig. 3), commences to operate.

As soon as sufficient air has escaped from the pressure cylinder 30 through the valve 32, the manometer 45 closes its contact 451 thereby energising the relay 43 which opens the anode circuit of the discharge vessel 42. The resistance 41 is thus switched out and the voltage is removed from the coil of the outlet valve 32. This valve closes (time $t_5$, Fig. 3), and the pressure in the electrode cylinder 30 again rises. The regulating device 33 in the pressure pipe of the cylinder 30 can be adjusted or regulated "down" so that the maximum value at which the electrode pressure increases is adjusted to produce the pressure increase corresponding to the curve shown in Fig. 3. This alteration in the position of the regulating device 33 can be made dependent upon the manometer 45 or upon a relay dependent on pressure and connected to the cylinder 30. Alternatively, the regulating device 33 can be controlled by a further contact operated by the contact disc 10 so that the regulating device 33 is adjusted between the times $t_3$ and $t_5$ of Figure 3.

In the meantime, the welding programme under the control of the programme disc 1 (Fig. 1) has been completed and the relay 15 is returned by the contact 12 to its blocking position. A starting impulse cannot be supplied through the contact 11 as the manometer contact 452 is in the circuit of the relay coil 152.

The end of the complete programme of a spot weld in determined by the time-delay relay 49. This relay commences to operate, as has already been mentioned, at the time $t_2$ (Fig. 3) and is so adjusted that its operation is completed at the time $t_6$ (Fig. 3). At this instant the relay 49 opens its lower contact 491 and closes its upper contact 492. Opening of the contact 491 interrupts the circuit of the inlet valve 31 of the pressure cylinder 30 so that the valve closes and the pressure in the cylinder 30 gradually falls, and also the holding circuit of the relay 47 so that this relay opens and interrupts the holding circuit of the relay 48.

The contact 492 of relay 49 ensures that this relay, after opening, cannot again close if at this instant the pedal switch 18 is still closed. Thus, the energising circuit of the time delay relay 49 is kept closed by the contact 182 (closed when the switch 18 is closed), even though the two relays 48 and 47 have already dropped. This ensures that the pressure and welding programmes cannot start again should the pedal switch not be opened. When the pedal switch 18 is opened and is then closed again, the pressure and current programmes are then carried out a second time in the abovedescribed manner.

In Fig. 4, which shows a third arrangement, only the parts of the apparatus for controlling the pressure programme are shown in detail and the parts of the apparatus for controlling the current programme are, for the sake of simplicity, omitted as they are similar to those of the arrangement shown in Fig. 1.

In this arrangement, an upper welding electrode 102 is pressed by the piston of a compressed air cylinder 101 against a lower electrode 103. The compressed air is supplied from a pipe 104 which communicates with a suitable compressed air container or compressed air producer. A valve 105 in the pipe 104 must be opened before the installation is set in operation. From the valve 105 a branch supplies compressed air to a pressure container 106, the pressure in this container being kept constant by an adjusting device 107. The pressure container 106 is connected by a pipe 108 to the lower end of the compressed air cylinder 101 so that air passing from the container 106 into the cylinder 101 tends to raise the upper electrode 102.

A second branch pipe from the valve 105 is connected to a two-position change-over valve 109 which, in the position shown in Fig. 4, in which the operating coil of the valve is not excited, connects the upper part of the compressed air cylinder 101 through a pipe 110 to atmosphere, so that the upper welding electrode 102 is lifted by compressed air from the pressure container 106. In the other position of the valve 109 to which the valve is moved by energisation of its operating coil, the air release pipe 110 is closed and the compressed air cylinder 101 is connected through a valve 111 and two compressed air regulators 112 and 113 to the pressure pipe 104. The valve 111 is, like the valve 109, a change-over valve and is provided with an electromagnetic actuating device. Before the commencement of the welding operation, i. e., with the valve 111 in the position shown in Fig. 4, compressed air from the valve 109 is delivered through the compressed air regulator 113 to the compressed air cylinder 101. When the exciter winding of the valve 111 is energised, the valve 111 changes over, the pipe through the regulator 113 is closed and the pipe through the regulator 112 is opened. The two regulators 112 and 113 are adjusted to different pressures in such a manner that the regulator 112 supplies a smaller pressure than the regulator 113.

Connected to the compressed air cylinder 101 is a further outlet valve 114 having a compressed air regulator 115 in its escape pipe. With the valve 114 open, the cylinder 101 is not entirely relieved of air but the pressure acting on the piston is only reduced to a definite extent which is dependent upon the setting of the regulator 115. The valve 114 is also provided with an electromagnetic actuating device.

The valves 111 and 114 are switched in or out under the control of grid-controlled discharge vessels, mercury vapour filled incandescent cathode discharge vessels preferably being used for this purpose. The actuating current is taken from a source 116 of direct current controlled by a switch 117, for example the pedal switch of the welding machine, the actuation of which initiates the welding operation. As is clear from the circuit diagram, the valve 111 is controlled by the discharge vessel 118, whilst the valve 114 is controlled by the two discharge vessels 119 and 120. The discharge vessel 119 serves for switching on and the discharge vessel 120 for switching off again the operating coil of the compressed air valve 114. The anode current circuit of the discharge vessel 118 includes a further switch 138 which is controlled by a rotating cam 139 and can be short-circuited by an auxiliary switch 140.

The discharge vessels 118, 119 and 120 are controlled by a cam disc 121 which actuates contacts 122, 123, 124, 125 and 126 arranged around its circumference. The contacts 124, 125 and 126 are respectively in the grid circuits of the discharge vessels 119, 118 and 120, whilst the contacts 122 and 123 control a relay 127 in such a manner that this relay is deenergised by the operation of the contact 122 of the disc 121 and energised by the operation of the contact 123. When the relay 127 is energised its operating contact 129 is closed, and its contact 128 opened.

The cam disc 121 corresponds to the switching device 10 to 13 of the arrangements shown in Figures 1 and 2 whilst the relay 127 corresponds to the relay 15 of these arrangements, that is, to the relay which controls the blocking of the connection between the programme disc for the welding current variation and the grid-controlled discharge vessels in the welding circuit. As with the arrangements of Figures 1 and 2, it is to be assumed that with the operating contact 128 of relay 127 open, the blocking in the grid circuit of the discharge vessels is rendered ineffective or neutralised. The grid circuit and the associated control circuits of the discharge vessels in the welding circuit are indicated generally at 130 in Figure 4 since the switching arrangements in this part of the circuit may be similar to the elements 1 to 9 and 16 of the arrangement shown in Figure 1.

In series with the cam contact 123 is the maximum contact of a manometer 131, the position of which is dependent upon the air pressure in the upper part of the cylinder 101.

The method of working of the arrangement shown in Figure 4 is as follows:

After the operator of the welding machine has opened the valve 105 in the compressed air pipe 104, he actuates the switch 117 in the supply circuit from the source 116 of direct current. The circuit of the operating coil of the valve 109 is thereby closed. This valve closes the air escape pipe of the compressed air cylinder 101 and opens the compressed air connection between the pipe 104 and the cylinder 101, through the change-over valve 111 and the pressure regulator 113. The air pressure in the upper part of the cylinder 101 rises and the upper welding electrode 102 is pressed against the lower electrode 103 against the air pressure of the pressure container 106. This part of the pressure curve corresponds to the pressure programme shown in Figure 3. As soon as the pressure above the piston has attained a definite minimum value, the manometer 131 closes its maximum contact and thereby prepares the circuit of the cam contact 123. The cam contact 123 is then closed after a definite time interval which depends on the position of the cam disc 121 when the manometer contact closes, and thereby causes energisation of the relay 127 from the direct current source 116. The relay 127 opens its contact 128 to render ineffective the blocking in the grid circuit of the main discharge vessels in the welding circuit, and by closing its contact 129 prepares control circuits for the contacts 124 to 126.

When the blocking is rendered ineffective by operation of the relay contact 128, the control of the current programme is initiated in the manner described above in connection with the arrangements shown in Figures 1 to 3, that is, the variation of the ignition time of the main discharge vessels in the welding circuit commences at a definite time after closing of the cam contact 123.

Further rotation of the cam disc 121 after closing of the cam contact 123, causes the contact 124 to close. Operation of this contact which, as mentioned above, has been prepared by the contact 129 of the relay 127, causes the discharge vessel 119 to be ignited as its cathode is now connected through the positive source 132 of control potential to its control grid. Ignition of the discharge vessel 119 energises the coil of the relief valve 114 of the compressed air cylinder 101. The pressure of the electrode 102 is thus lowered suddenly in the manner shown in Figure 3. This lowering of the pressure continues until at a definite later time the cam disc 121 closes the contact 125 and thereby ignites the discharge vessel 118 by means of the source 133 of control current. Ignition of this discharge vessel energises the coil of the change-over valve 111 which operates to connect the compressed air pipe 104 to the cylinder 101 through the regulator 112. This change-over has at first no effect since the air relief valve 114 is still open. By the change-over, however, a further step in the control pressure programme is prepared, since after closing of the relief valve 114, the pressure in the cylinder 101 increases not again to the maximum value but to a lower value controlled by the setting of the regulator 112 (see Figure 3).

After a further time interval, the cam disc 121 closes the cam contact 126 and ignites, by means of the control current source 134, the discharge vessel 120. The discharge vessel 119 is thus extinguished as the discharge vessels 119 and 120 are connected together through the condenser 135 and the resistances 136 and 137 in the manner known for direct-alternating current converters so that on the ignition of one vessel the arc in the other vessel is always extinguished. In consequence of the quenching of the discharge vessel 119, the coil of the valve 114 is de-energised and this valve closed so that the compressed air no longer escapes from the cylinder 101. The pressure of the welding electrode 102 now increases to a value controlled by the pressure regulator 112. If the operator of the welding machine opens the pedal switch 117, the coil of the compressed air valve 109 is de-energised and the escape pipe of the compressed air cylinder 101 opened. The pressure of the welding electrode 102 then falls to zero and the electrode is raised due to the pressure of the air in the container 106. Release of the pedal switch 117 also opens the anode circuits of the discharge vessels 118, 119 and 120 so that these can only be ignited by the cam switches 124 to 126. Furthermore, the relay 127 which by its contact 129 controls the grid circuits of the discharge vessels 118 to 120, is de-energised. The relay 127 also closes contact 128 and blocks the control device between the programme disc for the current variation and the grid circuit of the main discharge vessels in the welding circuit. The relay 127 cannot be again energised until the pressure in the cylinder 101 has increased to the maximum value for which the manometer 131 is adjusted.

It is important that the current programme and the pressure programme are only completed once even when the pedal switch 117 is held closed after the termination of a welding operation. This is ensured because when the cam disc 121, after actuation of the separate cam contacts 123, 124, 125 and 126 closes the cam contact 122, the relay 127 is moved by a second coil thereon into the blocking position, i. e. into that position in which the grid control circuits of the discharge vessels 119 and 120 are interrupted, and in which furthermore the connection between the welding current programme disc and the grid control circuit of the main discharge vessels is blocked. Only when the pedal switch 117 is released and again actuated can the relay 127 be brought by the cam contact 123 into the de-energised position so that, as described above, the switching sequence can be carried out as soon as the pressure in the electrode cylinder reaches its maximum value as determined by the setting of the manometer 131.

The method of operation of this arrangement as described above is for the spot welding in which the pedal switch 117 is closed and again opened for each separate spot weld. The control process described takes place in this way with each spot weld. If desired, the pedal switch 117 can also be connected to auxiliary relay arrangements which automatically open the switch circuit of the switch a predetermined time after its closing in order to prevent the control circuit being kept closed for an excessively long period if for any reason the welding machine attendant should forget to open the pedal switch 117 after the welding operation is completed.

The arrangement shown in Figure 4 is intended, however, not only for spot welding but also for spot-seam welding, i. e. for a welding in which at definite regular time intervals the pressure and current programmes are carried out in the manner described above. In this case, the pedal switch 117 is kept continuously closed and in addition the cam switch 138, 139 is operated. This cam switch is arranged in the anode circuit of the discharge vessel 118 and thus in the circuit of the coil of the compressed air change-over valve 111. When the auxiliary switch 140 is not closed, as is necessary with normal spot welding, the cam switch 138, 139 operates at definite regular time intervals to open the anode circuit of the discharge vessel 118 and quench the arc thereof. The circuit of the coil of the change-over valve 111 is thus interrupted and this valve returns to the upper position in which it is shown in Figure 4. This position corresponds in the pressure programme to the higher pressure. It then follows that after the quenching of the discharge vessel 118, the electrode pressure increases, in the manner outlined in detail above, to its maximum value. The manometer 131 closes its contact and thereby permits the control impulses of the cam disc 121 to take place. The cam control device 138, 139 is so designed, that the anode circuit of the discharge vessel 118, is only temporarily interrupted and again closed immediately afterwards.

With the arrangement operating in this manner spot welds are carried out at regular intervals in accordance with the combined welding and electrode pressure control programmes and these spot welds are each independently developed exactly like a single spot weld, the interval between these being dependent upon the cam disc 138, 139.

It has already been mentioned, that improved operation is obtained if the times of the pressure programme are quite independent of the current programme. With the arrangement shown in Figure 4, this is obtained by mounting the switches actuated by the cam disc 121 so that they can be moved around the circumference of the disc to any desired positions relative to one another. The time at which control circuits are closed by the individual cam switches can thus be varied at will and, where possible, also during the welding process. Thus, for example, by such movement of the switches, the duration of the fall of pressure as shown in the curve of Figure 3 can be increased or decreased as desired. Furthermore, the time of initiation of the current programme can be shifted forward or backward as desired relatively to the time at which the pressure, after reaching the maximum value, begins to fall. The welding current can start before the pressure falls, simultaneously with the fall of pressure or even after the pressure has fallen by a predetermined amount. The form of the cam disc 121 and of the associated contacts 122 to 126 as shown in Figure 4 is naturally to be regarded as only one convenient arrangement for carrying out the invention and, as will be understood, the detailed design of these contacts and the manner in which the time control is effected by them is not, in itself, material to basic features of the invention. If desired the mechanical contact may be replaced by a photo-electric contact arrangement provided that the design of the arrangement is such that the time corresponding to contact operation in the arrangement described above can be shifted as desired relatively to one another. Preferably, the programme disc for the current control and the cam disc 121 are arranged, as in the arrangement of Figure 1, on the same spindle driven by a synchronous motor, but, if desired, the programme and cam discs can be combined so that only a single programme disc is required. This single disc is then provided with slots for the photo-electric control of the ignition time and also with one or more cams for controlling contacts in the grid circuits of the discharge vessels 118 to 120.

It is also to be noted that the relay 127 may be modified in various ways. Thus, as shown in Figure 4, this relay has two operating contacts but the relay 127 can, under certain circumstances, be replaced by two separate relays, one of which has the control functions of the contact 129 and the other the control functions of the contact 128. It is, however important that by means of the relay arrangement used, the grid circuits of the discharge vessels should be prepared and simultaneously the blocking of the control circuit of the main discharge vessels of the spot welding machine should be neutralised or rendered ineffective.

The discharge vessels 118, 119 and 120 which are preferably grid-controlled are discharge vessels in association with the cam disc 121 and the contacts 124 to 126 can also be replaced by other switching devices capable of being actuated with smaller control currents. For example, instead of the discharge vessels, auxiliary relays might be arranged to control actuating relays for the compressed air valves. It is only necessary for such control arrangements to operate with the minimum possible time delay, so that the pressure programme is not affected by time delays in the associated switching devices. Arc discharge vessels have undoubtedly the advantage that they meet this requirement particularly well. With the use of this kind of discharge vessel, the control current circuits are simple and furthermore only a very small amount of switching energy need be controlled by the cam disc 121 and its contacts.

In the fourth arrangement shown in Figure 5, a compressed air cylinder 201, similar to the cylinder 101 of the arrangement shown in Figure 4, has a piston which presses the upper welding electrode 202 against the lower electrode 203. The compressed air is delivered from a pipe 204 connected to a suitable compressed air container or producer through a main valve 205 which must be opened before starting operation. One branch pipe from the valve 205 supplies compressed air to a container 206 through an adjusting device 207 which maintains the pressure in the container 206 constant. The pressure container 206 is connected through a pipe 208 to the compressed air cylinder 201 in such a manner that the air from the container 206 tends to raise the upper electrode 202.

The other branch pipe from the valve 205 is connected to a two-way change-over valve 209 which, in the position shown on Figure 5, that is, with its operating coil de-energised and the valve held in position, for example, by the spring shown, connects the upper part of the compressed air cylinder 201 through a pipe 210 to atmosphere, so that the upper welding electrode 202 can be moved upwardly by the compressed air of the container 206. In the other position of the change-over valve 209 to which it is moved by energisation of its coil, the escape pipe 210 is closed and the compressed air cylinder 201 is connected, through a change-over valve 211 and two compressed air regulators 212 and 213, to the delivery pipe 204.

The valve 211 is also controlled by an electro-magnet and is so constructed that on energisation of its coil it is moved to a position opposite to that shown. The two compressed air regulators 212 and 213 between the valve 211 and the compressed air cylinder 201 can each be adjusted to different values of the air pressure to suit a desired pressure programme. In the arrangement shown in Figure 5, it is assumed that before welding starts, the valve 211 closes the pipe including the pressure regulator 213 and opens the pipe including the regulator 212.

Connected to the compressed air cylinder 201 is a further outlet valve 214 which, when its coil is de-energised, is held by means of a spring in the closed position. By means of this valve, air can escape from the cylinder 201 through a compressed air regulator 215, that is, with valve 214 open, the pressure of the compressed air in the upper part of the cylinder 201 is reduced to a value which is dependent upon the setting of the regulator 215.

The two valves 211 and 214 are controlled by two controllable arc discharge vessels 216 and 217 which are, preferably, mercury vapour-filled incandescent cathode discharge vessels with control grids. The two discharge vessels are connected to one another through a condenser 218 and two series resistances 219 and 220 after the manner of a direct-alternating converter connection. A direct current source 221 for supplying the complete control apparatus serves as the source of current for this direct-alternating converter. A condenser 222 and an adjustable resistance 223 are connected in parallel with the resistance 219, the junction point between the condenser 222 and the resistance 223 being connected through a rectifier 224 to the resistance 219 and also through a source 225 of blocking potential to the control grid of the discharge vessel 217. The control grid of the discharge vessel 216 is also connected in series with a source 226 of blocking potential to the junction point of the two resistances 219 and 220.

An important feature of this arrangement is a relay A, the coil $A_1$ of which is connected across the resistance 219. This relay has a second winding $A_2$ which serves as the holding winding and contacts $a_1$, $a_2$ and $a_3$, the contacts $a_2$ and $a_3$ being closed when the relay is in its de-energised position, whilst the contact $a_1$ (holding contact) is, on the contrary, closed when the relay is energised. As will be apparent from the description of the operation of the arrangement given below the relay A enables the electrode pressures to be adjusted before and after the lowering of the pressure independently of one another.

The current programme is controlled in a similar manner to the arrangement of Figure 1 by means of a cam disc 227 during the revolution of which a preliminary contact 228 and two control contacts 229 and 230 are actuated successively. The contacts 229 and 230 are in the two exciting circuits of a polarised relay 231 which establishes the connection with the control circuit of the discharge vessels in the welding circuit. Depending upon which of the two windings of the relay 231 is energised means for blocking the control circuit of these discharge vessels is either neutralised or rendered effective. The method of operation of this blocking means which is associated with the contact 232 of the relay 231 is described in detail above in connection with the arrangement shown in Figure 1. It is important that the starting impulse for the current programme controlled by the contact 230 and the stop impulse for this programme, controlled by the contact 229, should be given by the same cam disc.

An impulse switch 233 constituted by, for example, a pedal switch, is used for initiating the operation of the complete apparatus, this switch controlling a relay B having contacts $b_1$, $b_2$ and $b_3$. The contact $b_1$ is a holding contact for the coil B and completes the energising circuit of the relay independent of the impulse switch 233. The contact $b_2$ controls the main supply circuit to the discharge vessels 216 and 217 and also the pneumatic valves 209, 211 and 214 whilst the contact $b_3$, when closed, short-circuits a condenser 234 in series in the circuit of one of the two coils of the polarised relay 231.

By means of the impulse switch 233 or the holding contact $b_1$ of the relay B, a time-delay relay Z is energised and operates a predetermined time after actuation of the switch 233, to open its normally closed back contact $z_1$.

The manner of operation of the arrangement shown in Figure 5 is as follows:

On actuation of the impulse or control switch 233 the coil of the pneumatic valve 209 is energised through the contact $b_2$. This valve closes the escape pipe 210 and connects the compressed air pipe 204 to the change-over valve 211. Compressed air enters the upper part of the electrode cylinder 201 through the valve 211 and the regulator 212 and the pressure rises to a value determined by this regulator. As soon as this value is reached, a manometer 235 communicating with the cylinder 201 closes its contact. The discharge vessel 216 is normally blocked due to the connection of its cathode to its grid through the source 226 of blocking potential. The operation of the contact of the manometer 235 closes a point in a circuit for short-circuiting this source of blocking potential. This circuit also includes the preliminary contact 228 controlled by the cam disc 227 and when this contact 228 closes following operation of the manometer contact, the discharge vessel 216 ignites. This ensures that the time of ignition of the discharge vessel 216 and thus the instant of the initiation of the control processes following this ignition bears a predetermined relation to the instant at which the starting contact 230 is actuated.

At the instant of ignition of the discharge vessel 216 there is a voltage across the resistance 219 and accordingly the coil of the escape valve 214 is energised. This valve operates and the pressure in the electrode cylinder 201 is reduced to a value determined by the setting of the regulator 215. Approximately simultaneously the current programme is initiated in the manner described in detail in connection with the arrangements shown in Figures 1 to 3. This time sequence between lowering of the pressure and initiation of the current programme, whilst being particularly desirable for many materials, is not, however, essential in arrangements according to the invention, for, by suitable adjustment of the switches actuated by the cam disc 227, different relative positions of current and pressure programmes can be obtained.

As the relay winding $A_1$ is also connected in parallel with the resistance 219, this relay is energised simultaneously with the actuation of the valve 214. In addition to closing the holding contact $a_1$ and the consequent energisation of the holding winding $A_2$, this relay opens its contacts $a_2$ and $a_3$. The contact $a_3$ is particularly important, as, when it opens, the circuit including the contact of the manometer 235 is interrupted for the remainder of the control operation and, therefore, the rest of the operation is independent of the position of the manometer. Even if, due to a rise of the electrode pressure during the later part of the programme, the contact of the manometer 235 should be closed, the discharge vessel 216 cannot be again ignited as the circuit for igniting it (short-circuiting the source 226) is interrupted at the contact $a_3$. The contact $a_3$ is only actuated again after the end of the whole welding programme, i. e., after the completion of both the pressure and the current programmes.

At the instant of the ignition of the discharge vessel 216, the condenser 222 commences to charge through the resistance 223, the charging time depending on the value of this resistance. As soon as the potential of the condenser 222 reaches a predetermined value, the blocking of the discharge vessel 217 is neutralised and this vessel is ignited. At the same time, due to the known direct-alternating converter action, the discharge vessel 216 is quenched by means of the condenser 218.

The voltage across the resistance 220, which is now in circuit due to the ignition of the discharge vessel 217, energises the winding of the change-over relay 211 in the compressed air pipe of the cylinder 201. This valve is changed over and connects the compressed air pipe 204 through the regulator 213, to the cylinder 201. The coil of the outlet valve 214 has already been de-energised due to the quenching of the discharge vessel 216. The pressure in the cylinder 201 now rises again, but to a fresh value which is determined by the regulator 213. This pressure value is on account of the locking device provided in accordance with the invention, independent of the pressure produced during the first pressure rise and can, if required, be greater than the electrode pressure determined by the regulator 212.

The mutual control of the times of ignition of the two discharge vessels 216 and 217 is of considerable importance since it enables the interval between the drop of pressure and the following rise of pressure to be adjusted as desired independently of the cam disc 227 and the current programme controlled thereby. This advantage is obtained by the fact that in the arrangement shown in Figure 5, as opposed to that shown in Figure 4, the two discharge vessels are controlled by purely electrical means, that is by an electrical time element constituted, in the arrangement shown, by the condenser 222 and the resistance 223. It will be appreciated, however, that the grid control shown in Figure 5 for the discharge vessels 216 and 217 is only by way of example and that any other suitable known time circuit may be used for controlling the discharge vessels in an analogous manner.

The completion of the entire programme is determined by the time-delay relay Z as this relay operates, at the expiration of a definite total time interval, to open its contact $Z_1$ and thereby de-energise the relay B which in turn opens the main control contact $b_2$. When the contact $b_2$ is opened the holding circuit of the relay A is opened and the contacts $a_2$ and $a_3$ of this relay return to their closed positions. The relay contact $a_2$ then prepares the energizing circuit for the coil of the change-over valve 211 in the compressed air pipe to the cylinder 201 so that at the commencement of the next following full programme the valve 211 is changed over from the position in which it is left at the conclusion of the preceding programme. Thus, at the commencement of the new pressure programme the compressed air pipe 204 is again connected to the cylinder 201 through the regulator 212.

What is claimed is:

1. In combination with an electric circuit element provided with arrangements for rendering it conductive and non-conductive at will, a device to render said element non-conductive for a limited time only, a control circuit in which current flow acts to render said element conductive, a capacitor, a double throw switch which in one of its positions connects said capacitor in series with said control circuit and in its other position opens said control circuit and connects a discharge path across the terminals of said capacitor, a switch in said control circuit which closes for a predetermined period after the expiration of said limited time, and means to short circuit said capacitor at will.

2. In combination with an electric circuit element provided with arrangements for rendering it conductive and non-conductive at will, a device to render said element non-conductive for a limited time only, a control circuit in which current flow acts to render said element conductive and non-conductive at intervals in accordance with a predetermined program, a capacitor, a double throw switch which in one of its positions connects said capacitor in series with said control circuit and in its other position opens said control circuit and connects a discharge path across the terminals of said capacitor, and a switch in said control circuit which closes for a predetermined period after the expiration of said limited time.

3. In combination with an electrical discharge tube having a control electrode, means to impress a blocking potential on said control electrode for a limited time only, a control circuit in which current flow acts to impress an unblocking potential on said control electrode, a capacitor, a double throw switch which in one of its positions connects said capacitor in series with said control circuit and in its other position opens said control circuit and connects a discharge path across the terminals of said capacitor, and a switch in said control circuit which closes for a predetermined period after the expiration of said limited time, and means to short circuit said capacitor at will.

4. In combination with an electrical discharge tube having a control electrode, means to impress a blocking potential on said control electrode for a limited time only, a control circuit in which current flow acts to impress a predetermined program of blocking and an unblocking potential on said control electrode, a capacitor, a double throw switch which in one of its positions connects said capacitor in series with said control circuit and in its other position opens said control circuit and connects a discharge path across the terminals of said capacitor, and a switch in said control circuit which closes for a predetermined period after the expiration of said limited time.

5. In combination with an electrical discharge tube having a control electrode, means to impress a cyclically recurring blocking potential of limited duration on said control electrode, a control circuit in which current flow acts to impress a predetermined program of blocking and unblocking potential on said control electrode, said program being synchronized relative to the first-mentioned blocking potential, a capacitor, a double throw switch which in one position connects said capacitor in series with said control circuit and in its other position opens said control circuit and connects a discharge path aross said capacitor, and a switch in said control circuit synchronized with the first-mentioned means and which closes for a predetermined period after the expiration of said limited duration.

6. In combination with an electrical discharge tube having a control electrode, means to impress a cyclically recurring blocking potential of limited duration on said control electrode, a control circuit in which current flow acts to impress a predetermined program of blocking and unblocking potential on said control electrode, said program being synchronized relative to the first-mentioned blocking potential, a capacitor, a double throw switch which in one position connects said capacitor in series with said control circuit and in its other position opens said control circuit and connects a discharge path across said capacitor, a switch in said control circuit synchronized with the first-mentioned means and which closes for a predetermined period after the expiration of said limited duration, and means to short circuit said capacitor at will.

7. In combination with a pair of welding electrodes and a line supplying current thereto, a current interrupting and regulating device, means for controlling said device to cause current flow between said electrodes to follow a predetermined program of variation with time, means to vary the welding electrode pressure from a higher value before the initiation of current flow to a lower value during said current flow, and means for controlling the time of initiation of said program by said means to vary the welding electrode pressure, the last-mentioned means being adjustable.

HERBERT KÖNIG.
WALTER MEENEN.
RICHARD SCHNARZ.
HEINRICH WILBERT.